(12) United States Patent
Baker

(10) Patent No.: US 6,339,397 B1
(45) Date of Patent: Jan. 15, 2002

(54) PORTABLE SELF-CONTAINED TRACKING UNIT AND GPS TRACKING SYSTEM

(75) Inventor: David A. Baker, Denver, CO (US)

(73) Assignee: Lat-Lon, LLC, Denver, CO (US)

( * ) Notice: Subject to any disclaimer, the term of this patent is extended or adjusted under 35 U.S.C. 154(b) by 0 days.

(21) Appl. No.: 09/585,873

(22) Filed: Jun. 1, 2000

(51) Int. Cl.[7] .............................. G01S 5/04; H01Q 1/42; H01Q 21/00
(52) U.S. Cl. .................. 342/357.07; 343/872; 343/879
(58) Field of Search ...................... 342/357.07, 357.09, 342/357.1, 357.06; 343/872, 878, 879

(56) References Cited

U.S. PATENT DOCUMENTS

| | | | |
|---|---|---|---|
| 4,009,375 A | | 2/1977 | White et al. ................ 235/150 |
| 4,749,997 A | * | 6/1988 | Canonico .................... 343/872 |
| 4,750,197 A | * | 6/1988 | Denekamp .................. 455/404 |
| 5,014,206 A | | 5/1991 | Scribner et al. ............ 364/449 |
| 5,119,102 A | | 6/1992 | Barnard ...................... 342/357 |
| 5,129,605 A | | 7/1992 | Burns et al. ................. 246/25 |
| 5,155,689 A | | 10/1992 | Wortham .................... 364/460 |
| 5,223,844 A | | 6/1993 | Mansell et al. ............. 342/357 |
| 5,225,842 A | | 7/1993 | Brown et al. ............... 342/357 |
| 5,299,132 A | | 3/1994 | Wortham .................... 364/460 |
| 5,379,224 A | | 1/1995 | Brown et al. ............... 364/460 |
| 5,398,190 A | | 3/1995 | Wortham .................... 364/460 |
| 5,452,262 A | * | 9/1995 | Hagerty ......................... 367/6 |
| 5,513,111 A | | 4/1996 | Wortham .................... 364/460 |
| 5,751,245 A | * | 5/1998 | Janky et al. ........... 342/357.07 |
| 5,917,433 A | | 6/1999 | Keillor et al. .............. 340/989 |
| 6,037,912 A | * | 3/2000 | DeMarre ..................... 343/815 |

* cited by examiner

Primary Examiner—Gregory C. Issing

(57) ABSTRACT

A portable self-contained tracking unit includes an enclosure attached to a mounting plate, with a hollow interior cavity housing a GPS receiver, a microprocessor and a transmitter. The GPS receiver will receive tracking data and the microprocessor will process the tracking data into a data packet. The transmitter transmits the data packet to a remote receiving station, for transmission to a central database. Photoelectric cells are mounted on the enclosure to recharge batteries which provide power to the electrical components of the tracking unit. The enclosure is designed with a pair of vertically oriented side panels which are generally orthogonally oriented so that the solar panels mounted on the side panels will maintain a favorable solar incidence angle during a wide range of orientations. The transmitter is a cellular telephone with an antenna mounted within the enclosure but spaced a distance from the metal mounting plate and electrical components approximately one-quarter wavelength of the operating frequency of the transmitter. The enclosure is formed of a radio frequency and optically transparent material, so that the antenna and the solar panels may be housed within the hollow interior cavity of the enclosure. In the method of the invention, tracking data is periodically transmitted via cellular phone to a cellular service provider, thence to a data service bureau which sends the data over the Internet to the database of a central server computer. The central server computer will decode the information and provide an interface and value added products such as maps and reports for customers via a web page on the Internet.

9 Claims, 6 Drawing Sheets

PORTABLE SELF-CONTAINED TRACKING UNIT AND GPS TRACKING SYSTEM

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1). Field of the Invention

The present invention relates generally to a system for tracking objects on the earth's surface using global positioning system (GPS) satellites and then transmitting that position information via radio signal to a base receiver, and more particularly, a rugged, solar-powered, self-contained system utilizing GPS, cell phone control channel data transmission technology, and the Internet to deliver the object's position to the end user.

(2). Background Information

The tracking of various cargo and other shipments by industry is becoming a highly desirable service to both customers and the shipping industry. With greater use of global computer networks, the consuming public demands greater accuracy and tracking capabilities for various products and shipments.

One example is the trucking industry, wherein drivers of vehicles periodically communicate with a home office to report the location of the vehicle and the status of the shipment. Similar systems are used for the shipping of mail and other packages, with updates to the location of the package with the carrier, as well as its estimated time of arrival, and other related information. Another industry where tracking of cargo is highly desirable is the railroad industry. The capability of tracking a particular freight car and shipment has become quite valuable to this industry.

In the prior art, there are three main systems for determining the location of a vehicle or object. First, the vehicle or shipment may be manually tracked by a person identifying the particular shipment and its location, and manually calling in that location to a home office. The trucking industry conventionally utilizes a system of this sort, but individual tracking of train cars by such a system would be unfeasible.

Other systems for tracking vehicles and shipments include LORAN and GPS. Both of these systems rely on externally transmitted radio frequency signals to calculate the location of a receiving antenna mounted on the vehicle. In LORAN systems, the calculation is based on the time difference and signals received from multiple transmitters. Because the latitude and longitude of the transmitters are known, the distance from two or more transmitters can be calculated from the time differential between the reception of the plurality of signals.

In the GPS tracking system, transmitters are positioned on orbiting satellites. GPS uses a suedo-random data stream encoded on each satellites' carrier frequency. The receiver is synchronized with the data stream by matching an identical suedo-random data stream albeit with a time offset. The time offset between the receiver's data stream and the data stream received from the satellite give the distance to that satellite via the speed of light that the radio signal traveled. The receiver then triangulates its position using three or more satellites and by knowing where the satellites are via their ephemeris data. GPS systems have been developed to be extremely accurate in locating and tracking a receiver on the surface of the earth.

One of the main drawbacks of prior art GPS tracking systems is the GPS unit's dependency on power provided by the object being tracked. In the trucking industry, the units draw a sufficient amount of power that they must be connected to the electrical system of the vehicle for continuous use over a period of time. Similarly, tracking a train having a plurality of freight cars would occur by mounting the GPS receiver in the locomotive, to a source of electrical power located only therein.

Other methods for tracking or reporting the position of a railcar (and its load) have included the use of bar-codes on each car which are scanned by readers located at railyards (on other locations). This was modified by the use of Radio Frequency IDentification (RFID) tags, which respond with a unique code upon interrogation by a track-side reader. The drawbacks to both these methods include: (1) the location of a car is reported to the railroad and not to the owner of the shipment/load; and (2) the methods can only report the location of a car which moves by a reader, and therefore is not a generalized locating device.

BRIEF SUMMARY OF THE INVENTION

It is therefore a general object of the present invention to provide an improved generalized tracking unit and associated tracking system.

Another object of the present invention is to provide a self-powered and self-contained tracking receiver/transmitter.

A further object is to provide a tracking receiver which will transmit a wide variety of data with a simple and small block of information.

Yet another object of the present invention is to provide a self-contained receiver/transmitter unit which may be attached to a cargo container and will automatically transmit information for long periods of time and withstand harsh environments of weather and vibrations.

These and other objects of the present invention will be apparent to those skilled in the art.

The portable self-contained tracking unit of the present invention includes an enclosure attached to a mounting plate, with a hollow interior cavity housing a GPS receiver, a microprocessor, a transmitter and rechargeable batteries. The GPS receiver will receive tracking data and the microprocessor will process the tracking data into a data packet. The transmitter transmits the data packet to a remote receiving station, for transmission to a central database. Photoelectric cells are mounted on the enclosure to provide power to the rechargeable batteries which power the components of the tracking unit. The enclosure is designed with a pair of vertically oriented side panels which are generally orthogonally oriented so that the solar panels mounted on the side panels will maintain a favorable solar incidence angle during a wide range of orientations. The transmitter is a cellular telephone with an antenna mounted within the enclosure but spaced a distance from the metal mounting plate and electrical components approximately one-quarter wavelength of the operating frequency of the transmitter. The enclosure is formed of a radio frequency and optically transparent material, so that the antenna and the solar panels may be housed within the hollow interior cavity of the enclosure. In the method of the invention, tracking data is periodically transmitted via cellular phone to a cellular service provider, thence to a data service bureau which sends the data over the Internet to the database of a central server computer. The server computer will decode the information and provide an interface for customers via web pages on the Internet.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
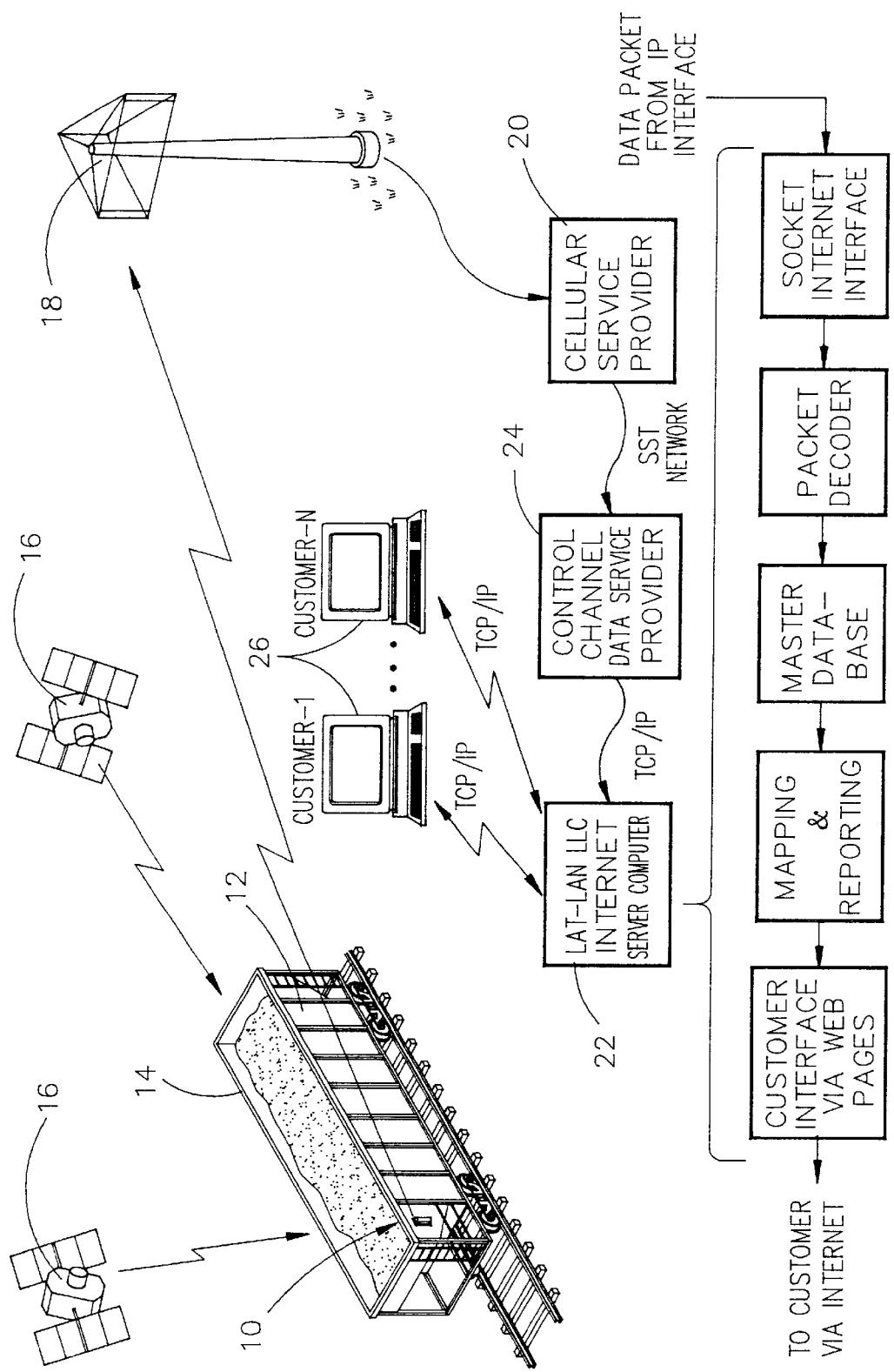
FIG. 1 is a schematic view showing a flowchart of the method of tracking a cargo container using the tracking system of the present invention.

Referring now to the drawings, and more particularly to FIG. 1, the tracking unit of the present invention is designated generally at 10 and is shown mounted on a vertical side wall 12 of a railroad freight car 14. Obviously, tracking unit 10 may be attached to a wide variety of objects which are desired to be tracked, such as tractor trailer units, cargo containers, and other objects and shipments.

Tracking information is received from a plurality of GPS satellites 16 and processed by tracking unit 10. A data packet is then transmitted via cellular telephone to a cell tower 18, thence by a cellular service provider 20 to an Internet-connected server computer 22. In the preferred embodiment of the invention, tracking information in the data packet is routed from the cellular service provider 20 to a data service bureau 24, which then sends the data over the Internet to server computer 22, where it is decoded and loaded into a computer database utilizing an automated software interface. This computer database in server computer 22 is accessible to customers 26 through a web page interface.

Figure 2:
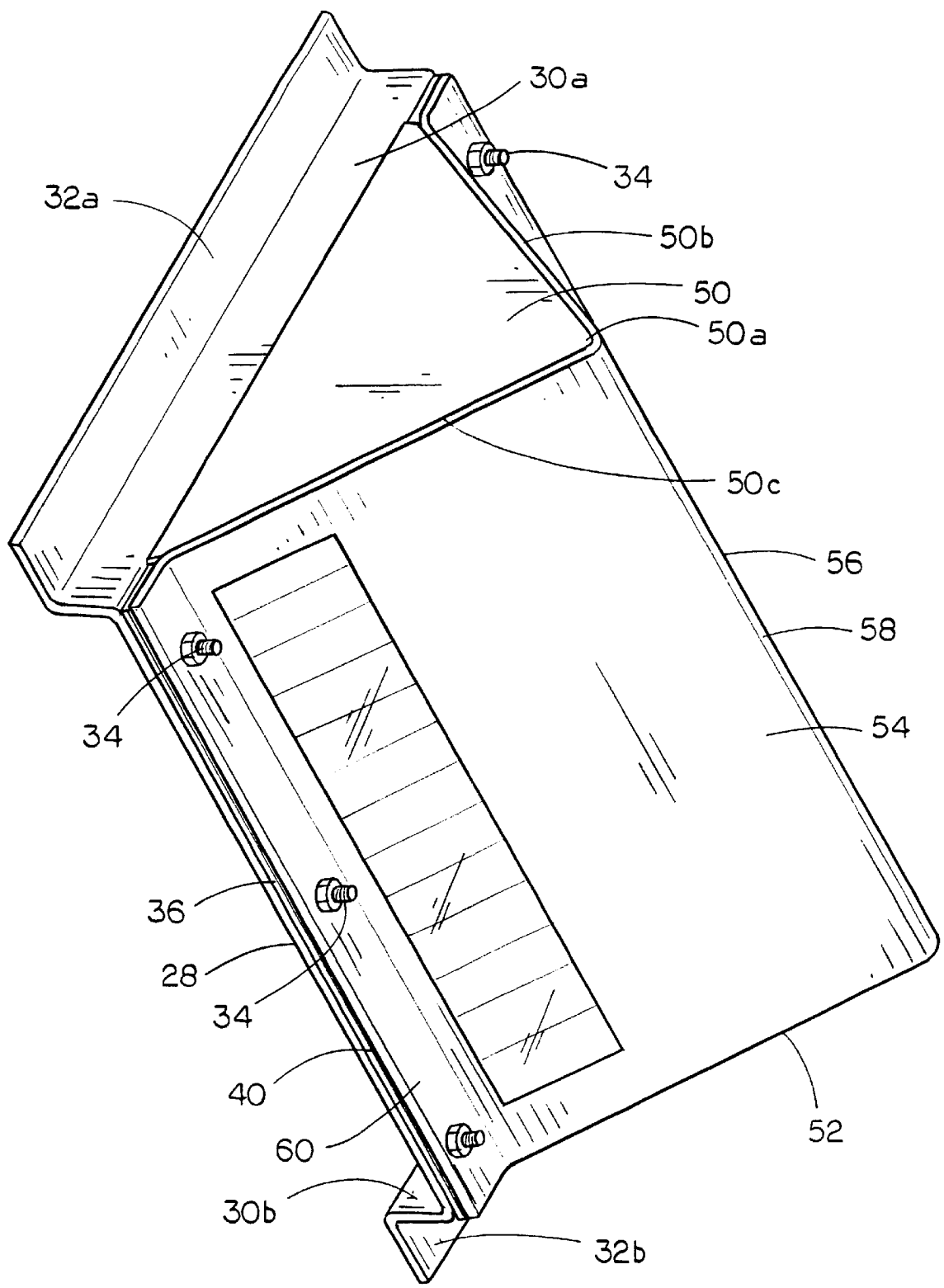
FIG. 2 is a perspective view of a portable tracking unit of the present invention.
Figure 3:
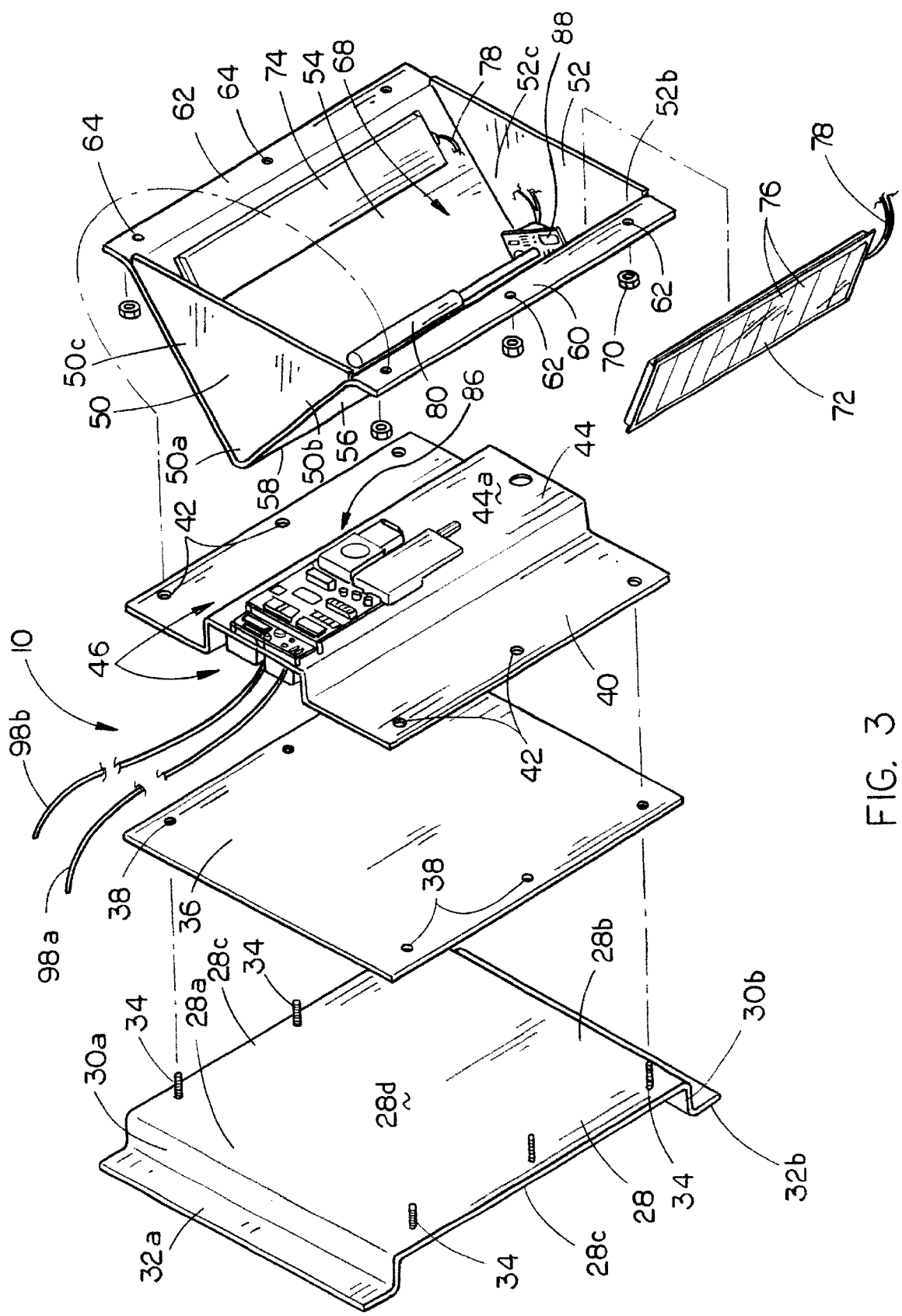
FIG. 3 is an exploded perspective view of the tracking unit.
Figure 4:
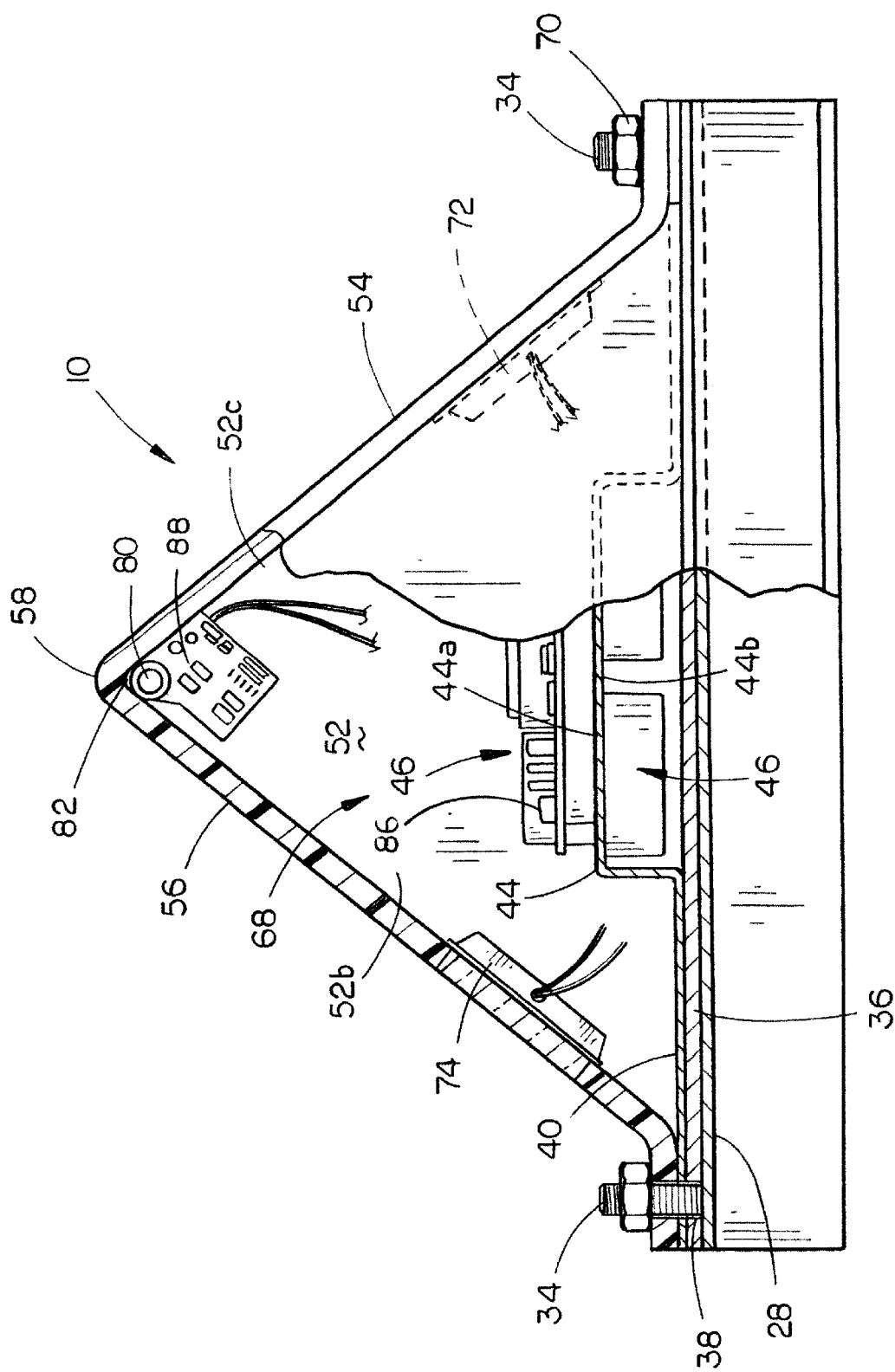
FIG. 4 is an end elevational view, with portions cut away to reveal the interior of the tracking unit.

Referring now to FIGS. 2–4, the tracking unit 10 of the present invention is shown in more detail. Tracking unit 10 is a self-contained unit with its own power source, and is designed for attachment to a wide variety of containers and other shipments which are desired to be tracked. A flat steel mounting plate has upper and lower edges 28a and 28b, and opposing parallel side edges 28c. A pair of upper and lower legs 30a and 30b extend orthogonally from the rearward face of mounting plate 28, along the upper and lower edges 28a and 28b respectively. A pair of upper and lower flanges 32a and 32b extend along each of upper and lower legs 30a and 30b, and are oriented parallel to plate 28. Flanges 32a and 32b are used for attaching tracking unit 10 to a railroad car vertical side wall 12 (shown in FIG. 1) or other object to be tracked. Legs 30 will space mounting plate 28 outwardly away from the wall to which the tracking unit 10 is attached, thereby permitting firm attachment to a surface which undulates or has bumps, and absorbs shocks to the cargo container to which it is attached.

A plurality of threaded bolts 34 project outwardly from the forward face 28d of plate 28, and are arranged proximal side edges 28c. A steel, flat back plate 36 of substantially the same size as mounting plate 28, has a plurality of apertures 38 located to receive bolts 34 therethrough, and thereby align back plate 36 in flush contact with mounting plate 28.

A steel electronics plate 40 has a length and width substantially the same as that of back plate 36 and mounting plate 28, and a plurality of apertures 42 aligned along side edges to receive bolts 34, in the same fashion as back plate 36. Electronics plate 40 includes a forwardly projecting bridge 44 with forward and rearward faces 44a and 44b respectively. The various electrical components, designated generally at 46, may thereby be attached to electronics plate 44 on either the forward face 44a or the rearward face 44b, and spaced from back plate 36.

An enclosure 48 includes generally triangular shaped upper and lower ends 50 and 52, each having a forwardly projecting apex 50a and 52a, and rearwardly diverging side edges 50b and 50c, and 52b and 52c respectively. A pair of side panels 54 and 56 are connected along a ridge 58 extending between the apexes 50a and 52a of end walls 50 and 52. Side panels 54 and 56 extend from side edge 50b to side edge 52b and from side edge 50c to side edge 52c of upper and lower end walls 50 and 52 respectively. A mounting flange 60 extends the length of the free edge of side panel 54, and includes apertures 62 located to receive bolts 34 therethrough. A second flange 64 extends the length of the free side edge of the other side panel 56, and includes apertures 66 to receive bolts 34 therethrough. Flanges 60 and 64 are coplanar, and parallel to the base edges 50d and 52d of triangular end walls 50 and 52, such that enclosure 48 forms a hollow interior designated generally at 68 in FIGS. 3 and 4, when nuts 70 are attached to bolts 34 to thereby fasten flanges 60 and 62 on to the electronic plate 40, back plate 36, and mounting plate 28.

A pair of solar panels 72 and 74 are mounted to the interior faces of side panels 54 and 56. Each solar panel 72 and 74 includes a plurality of photoelectric cells 76, and has a pair of wires 78 extending therefrom to provide electrical power to the tracking unit 10. Preferably, the solar panels 72 and 74 and their associated rechargeable storage batteries, are electrically isolated from one another, to permit continued operation of the tracking unit 10 in the event that one of the solar panels or rechargeable batteries fails.

In the preferred embodiment of the invention, enclosure 48 is formed of a clear polycarbonate material. Thus, the material is optically transparent, permitting mounting of solar panels 72 and 74 on the interior of the enclosure. In addition, the material is radio frequency transparent, to permit signals from GPS as well as transmissions from the transmitter of the tracking unit to pass through the enclosure 48. The entire enclosure 48 outside surface is preferably painted with an opaque paint, except for portions of side panels 54 and 56 located directly over solar panels 72 and 74. Thus, optically transparent "windows" are formed on side panels 54 and 56, to permit sunlight to pass through the side panels to solar panels 72 and 74.

Because solar panels 72 and 74 are located within the interior 68 of enclosure 48, they are protected from the weather.

An elongated antenna 80 is mounted within the interior 68 of enclosure 48, within the valley 82 formed by the connection of side panels 54 and 56 at ridge 58. In this way, antenna 80 will be oriented vertically and will have a one quarter wavelength standoff from plates 28, 36, and 40.

As shown in FIG. 4, side panels 54 and 56 are connected to the long ridge 58 at approximately a right angle. In this way, the vertical orientation of ridge 58 of tracking unit 10 will maximize the "viewing angles" for solar panels 72 and 74 and thereby maximize the chance of direct sunlight on one of solar panels 72 and 74 during any random rotation of the tracking unit 10 about a vertical axis.

Figure 5:
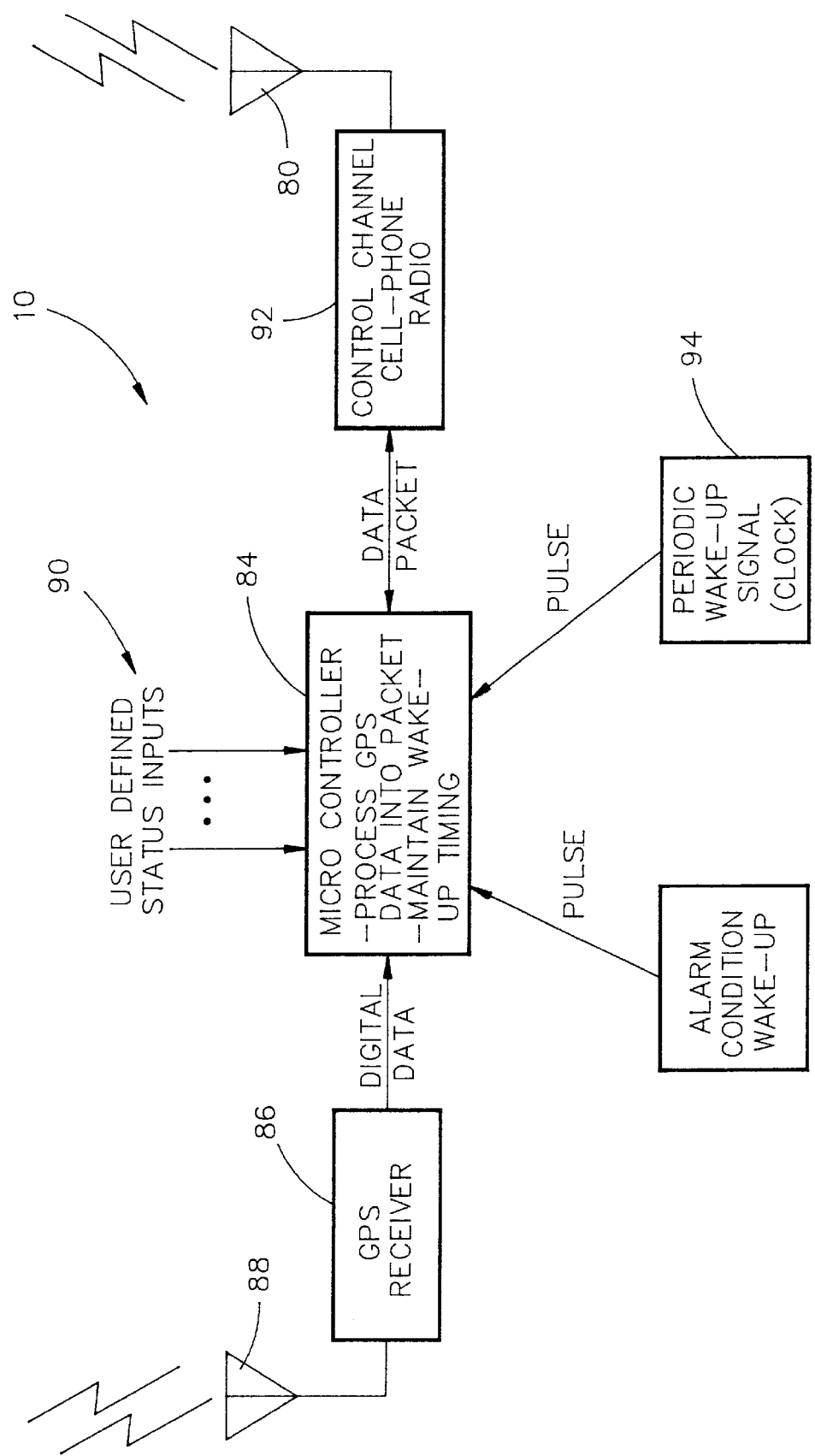
FIG. 5 is a flowchart of the operation of the tracking unit.

Referring now to FIG. 5, a block diagram discloses the electrical components of tracking unit 10. A microprocessor or controller 84 receives various data and signals from other components and is powered by batteries which are charged from the solar panels. A GPS receiver 86 (also shown in FIGS. 3 and 4) receives tracking information from various satellites of the GPS, via GPS antenna 88 (also shown in FIGS. 3 and 4). This data is transmitted in digital form from the receiver to the microprocessor 84. This information includes latitude, longitude, heading, velocity, time, and elevation. Other defined data inputs such as multiple alarm states, high and low priority alarm alerts, and miscellaneous external measurements may be programmed into micro controller 84 through the user defined status inputs designated generally at 90.

Data from the GPS is processed by the micro controller and formatted as a data packet which is either immediately transmitted by cellular telephone, or stored in EEPROM until the tracking unit is within range of a cellular telephone tower. Transmitter 92 is preferably a cellular telephone or radio transmitter, and is connected to the micro controller to transmit the data packets via antenna 80. In the preferred embodiment of the invention, transmitter 92 is a commercially available cellular phone without a user interface (keys, display, microphone or a speaker), that is configured to communicate with host micro controller 84, and includes special options enabling it to communicate data to data service bureau 24 (shown in FIG. 1).

In order to extend the life and reduce required power of tracking unit 10, the micro controller, GPS receiver, and transmitter 92 are maintained in an "off" condition until periodically "awakened" with an "alarm condition" or a periodic "wake up" signal from a clock. Clock 94 is a very low powered timing circuit. Thus, only the clock is powered during "idle" periods, vastly reducing the power required to run the unit and enabling the unit to operate using small solar panels which recharge small storage batteries.

A second method for "awakening" the electronic components of tracking unit 10 is an "alarm" condition 96. A pair of wire loops 98a and 98b (shown in FIG. 3) are connected to unit 10 by a common connector with four leads. A small voltage potential is placed on each outgoing lead and measured on the return lead. If a loop is broken, the return voltage drops to zero, and the microprocessor will determine that an "alarm" condition exists.

One loop 98a is set up as a simple status line for the user to use in any manner. For example, if the unit 10 is used on a train freight car (FIG. 1), a switch could be interposed in loop 98a and actuate upon the springs of the freight car being depressed (indicating that the car 14 is loaded). The second loop 98b is similar to loop 98b, but may indicate some other alarm condition. For example, the second loop could be connected to the door of a box car, such that opening the door breaks the wire loop 98b. This would cause the unit 10 to "awaken" and send a position fix, with an added data bit indicating that an alarm condition caused the wake-up condition. Thus, the consumer will have access to information as to the time and location when a shipment was opened.

Figure 6:
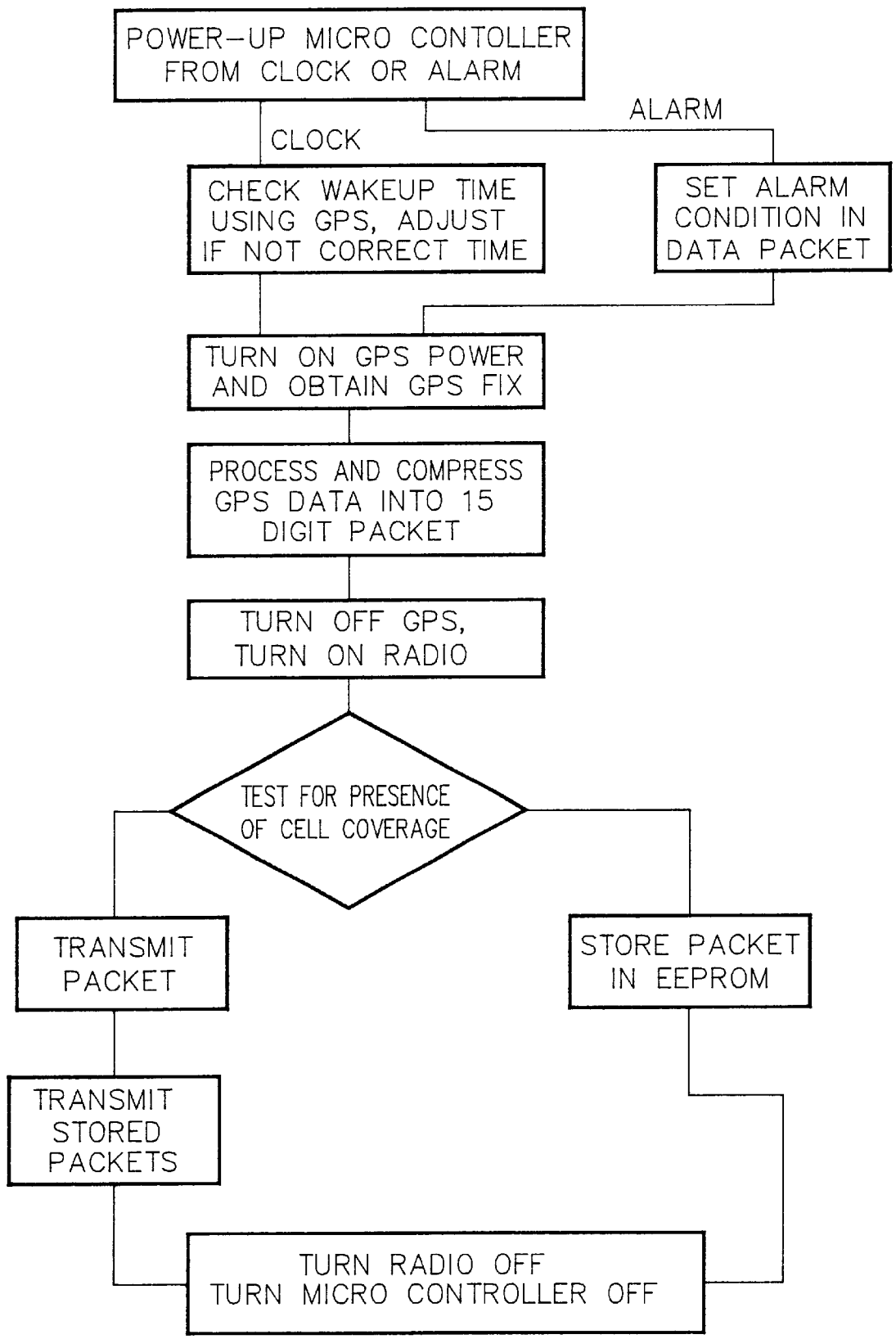
FIG. 6 is a flowchart of the micro controller process.

Referring now to FIG. 6, a block diagram of the micro controller process is set forth in more detail. The first step in the process includes a "power up" pulse signal to the micro controller from either the clock or from an alarm condition. If the power up is from an alarm condition, that alarm condition is digitally encoded into the data packet which is transmitted by the micro controller. If the power up is from a clock signal, the "wake up time" is checked against the GPS receiver's clock and adjusted if not correct.

Once the microprocessor is "awake" it obtains a GPS fix, and compresses the data from the GPS (and any alarm condition or other external measurements) into a small data packet. Once the GPS data has been compressed, the GPS receiver is turned off and the transmitter is turned on. Since the preferred transmitter is a cellular telephone, the next step in the process is to test for the presence of cellular telephone coverage. If the tracking unit is not located within current cell coverage, then the data packet is stored in EEPROM for later transmittal. If the tracking unit determines that it is located within cellular telephone coverage, then the current data packet, and any previously stored data packets, are transmitted to the cellular tower. Once the data packets have been transmitted, or stored in EEPROM, the radio is turned off and the micro controller is shut down to await the next occurrence of a "wake up" condition.

Referring once again to FIG. 1, a block diagram shows the process for use of the information from the data packet which is received through the cellular service provider 20, sent over the Internet by a data service bureau 24 to the server computer. Hardware and software in the server computer includes an Internet interface, and a packet decoder to decode the information from the data packet. The decoded information is stored in a master database for use by customers. This database is accessible through an Internet web site, and provides such products as high and low priority alarm alerts, maps showing asset location, direction and speed of travel, expected arrival times to user identified locations, as well as standard and custom text reports. All of this information is interfaced with the customer via web pages and the Internet.

Whereas the invention has been shown and described in connection with the preferred embodiment thereof, many modifications, substitutions and additions may be made which are within the intended broad scope of the appended claims.

I claim:
1. A tracking unit, comprising:
 a generally planar mounting plate having upper and lower edges, opposing side edges, and forward and rearward faces;
 an enclosure connected to the mounting plate forward face forming a hollow interior cavity, the enclosure formed of a radio-frequency-transparent material;
 said enclosure including a pair of side panels connected together along a first side edge and oriented at an angle to one another for form a vertically-oriented ridge, each side panel having a second side edge connected to opposing side edges of the mounting plate, said ridge oriented parallel to the mounting plate;
 said side panels being generally planar, and oriented at an angle to one another generally in the range of 80°–100°;
 a GPS receiver mounted within the hollow cavity, operable to receive tracking data from CPS;
 a microprocessor mounted within the hollow cavity, connected to the GPS receiver and operable to receive tracking data from the GPS receiver and process the tracking data into a data packet;
 a transmitter within the hollow cavity, connected to the microprocessor and operable to transmit a data packet from the microprocessor to a remote receiving station;
 a solar panel of photoelectric cells mounted on the enclosure for converting solar radiation into an electrical current, said solar panel electrically connected to at least a first rechargeable battery, which is connected to the receiver, microprocessor and transmitter, to provide electrical current thereto; and
 a second solar panel of photoelectric cells mounted on the enclosure and electrically connected to at least a second rechargeable battery, which is electrically connected to the receiver, microprocessor and transmitter, to provide electrical current thereto, said first solar panel mounted on and in a plane parallel to one of said side panels and the second solar panel mounted on and in a plane parallel to the other side panel.

2. The tracking unit of claim 1, wherein said solar panels and their associated batteries are operable independent of each other, to provide electrical current regardless of the operation of the other panel and battery.

3. The tracking unit of claim 1, wherein said solar panels are mounted within the hollow cavity to an interior face of the side panels, and wherein the side panels have portions juxtaposed over the solar panel which are optically transparent.

4. A tracking unit, comprising:
- a generally planar mounting plate having upper and lower edges, opposing side edges, and forward and rearward faces;
- an enclosure connected to the mounting plate forward face forming a hollow interior cavity, the enclosure formed of a radio-frequency-transparent material;
- said enclosure including a pair of side panels connected together along a first side edge and oriented at an angle to one another for form a vertically-oriented ridge, each side panel having a second side edge connected to opposing side edges of the mounting plate, said ridge oriented parallel to the mounting plate;
- a GPS receiver mounted within the hollow cavity, operable to receive tracking data from CPS;
- a microprocessor mounted within the hollow cavity, connected to the GPS receiver and operable to receive tracking data from the GPS receiver and process the tracking data into a data packet;
- a transmitter within the hollow cavity, connected to the microprocessor and operable to transmit a data packet from the microprocessor to a remote receiving station;
- said transmitter including an antenna of predetermined length, said antenna mounted in a valley formed between the side panels within the hollow cavity diametric to the ridge and spaced a distance from the mounting plate a distance about one-half the length of the antenna; and
- a solar panel of photoelectric cells mounted on the enclosure for converting solar radiation into an electrical current, said solar panel electrically connected to at least a first rechargeable battery, which is connected to the receiver, microprocessor and transmitter, to provide electrical current thereto.

5. The tracking unit of claim 4, wherein said transmitter is a cellular telephone having a predetermined operating wavelength, and wherein the antenna has a length of about one-half wavelength.

6. In combination:
- a cargo shipment within a container having at least one generally vertical sidewall;
- a generally planar mounting plate mounted on the container side wall and oriented in a plane parallel thereto, said mounting plate having upper and lower edges, opposing side edges, and forward and rearward faces;
- an enclosure connected to the mounting plate forward face and forming a hollow interior cavity, the enclosure formed of a radio-frequency-transparent material;
- said enclosure including a pair of side panels connected together along a first side edge and oriented at an angle to one another to form a vertically-oriented ridge, each side panel having a second side edge connected to opposing side edges of the mounting plate, said ridge oriented parallel to the mounting plate;
- a GPS receiver mounted within the hollow cavity, operable to receive tracking data from GPS;
- a microprocessor mounted within the hollow cavity, connected to the GPS receiver and operable to receive tracking data from the GPS receiver and process the tracking data into a data packet;
- a transmitter within the hollow cavity, connected to the microprocessor and operable to transmit a data packet from the microprocessor to a remote receiving station;
- a solar panel of photoelectric cells mounted on the enclosure for converting solar radiation into an electrical current, said solar panel electrically connected to at least one rechargeable battery, which is electrically connected to the receiver, microprocessor and transmitter, to provide electrical current thereto; and
- a second solar panel of photoelectric cells mounted on the enclosure and electrically connected to at least a second rechargeable battery, which is electrically connected to the receiver microprocessor and transmitter, to provide electrical current thereto, said first solar panel mounted on and in a plane parallel to one of said side panels and the second solar panel mounted on and in a plane parallel to the other side panel.

7. The combination of claim 6, wherein said solar panels and their associated batteries are operable independent of each other, to provide electrical current regardless of the operation of the other panel and battery.

8. In combination:
- a cargo shipment within a container having at least one generally vertical sidewall;
- a generally planar mounting plate mounted on the container side wall and oriented in a plane parallel thereto, said mounting plate having upper and lower edges, opposing side edges, and forward and rearward faces;
- an enclosure connected to the mounting plate forward face and forming a hollow interior cavity, the enclosure formed of a radio-frequency-transparent material;
- said enclosure including a pair of side panels connected together along a first side edge and oriented at an angle to one another to form a vertically-oriented ridge, each side panel having a second side edge connected to opposing side edges of the mounting plate, said ridge oriented parallel to the mounting plate;
- a GPS receiver mounted within the hollow cavity, operable to receive tracking data from GPS;
- a microprocessor mounted within the hollow cavity, connected to the GPS receiver and operable to receive tracking data from the GPS receiver and process the tracking data into a data packet;
- a transmitter within the hollow cavity, connected to the microprocessor and operable to transmit a data packet from the microprocessor to a remote receiving station;
- said transmitter including an antenna of predetermined length, said antenna mounted in a valley formed between the side panels within the hollow cavity diametric to the ridge and spaced a distance from the mounting plate a distance about one-half the length of the antenna;
- a solar panel of photoelectric cells mounted on the enclosure for converting solar radiation into an electrical current, said solar panel electrically connected to at least one rechargeable battery, which is electrically connected to the receiver, microprocessor and transmitter, to provide electrical current thereto.

9. The tracking unit of claim 8, wherein said transmitter is a cellular telephone having a predetermined operating wavelength, and wherein the antenna has a length of about one-half wavelength.

* * * * *